(12) United States Patent
Mann et al.

(10) Patent No.: US 6,900,758 B1
(45) Date of Patent: May 31, 2005

(54) SYSTEM, METHOD, APPARATUS AND MEANS FOR CONSTRUCTING BUILDING TOMOGRAPHY AND TIMING INFORMATION

(75) Inventors: Wallace Mann, Mill Valley, CA (US); Anant Sahai, Berkeley, CA (US)

(73) Assignee: SiRF Technology, Inc., San Jose, CA (US)

(*) Notice: Subject to any disclaimer, the term of this patent is extended or adjusted under 35 U.S.C. 154(b) by 110 days.

(21) Appl. No.: 10/272,441

(22) Filed: Oct. 16, 2002

(Under 37 CFR 1.47)

Related U.S. Application Data

(60) Provisional application No. 60/330,169, filed on Oct. 17, 2001.

(51) Int. Cl.⁷ .............................. G01S 5/02; H04B 7/185
(52) U.S. Cl. .............................. 342/357.02; 342/357.06
(58) Field of Search ..................... 342/357.02, 357.06, 342/450, 453; 455/65; 701/207, 213

(56) References Cited

U.S. PATENT DOCUMENTS

| | | | | |
|---|---|---|---|---|
| 5,815,539 A | * | 9/1998 | Lennen | 375/371 |
| 5,963,582 A | * | 10/1999 | Stansell, Jr. | 375/148 |
| 6,252,546 B1 | * | 6/2001 | Lennen et al. | 342/363 |
| 6,727,846 B1 | * | 4/2004 | Brown | 342/357.06 |

\* cited by examiner

*Primary Examiner*—Dao Phan
(74) *Attorney, Agent, or Firm*—MacPherson Kwok Chen & Heid LLP

(57) ABSTRACT

A server provides GPS aiding data to mobile GPS receivers are provided with an enclosed environment (e.g., within a large building) where the received GPS signal is likely to be weak or suffer multipath signal interference. The server receives GPS signals from one or more antennas within the enclosed environment and measures the multipath error in the vicinity of each antenna. Using the multipath error data for various satellite positions at various times, the server creates a delay model for the enclosed environment to generate GPS aiding data for the mobile GPS receivers. A generic delay model can be created that is applicable to similarly constructed buildings.

15 Claims, 4 Drawing Sheets

SYSTEM, METHOD, APPARATUS AND MEANS FOR CONSTRUCTING BUILDING TOMOGRAPHY AND TIMING INFORMATION

CROSS REFERENCE TO RELATED APPLICATIONS

This application claims the benefit of U.S. Provisional Patent Application No. 60/330,169, filed Oct. 17, 2001, with the same title of this application.

FIELD OF THE INVENTION

The present invention relates to the use of GPS data. More particularly, embodiments of the present invention relate to the use of GPS data within buildings or other attenuated-signal areas.

BACKGROUND

Global positioning system (GPS) timing and positioning information is used in a wide variety of applications. It is desirable to allow the use of such information in low signal areas, such as inside buildings. These environments present many difficulties in the use of GPS timing and positioning information due to multipath, signal delay, and other signal distortions caused by different structures. As a result, it is difficult to provide accurate aiding data to receivers located within a building or other attenuated environment (for simplicity, all such attenuated environments will be referred to herein as a "building").

It would be advantageous to provide a method and apparatus that overcame the drawbacks of the prior art. It would be desirable to utilize GPS techniques inside buildings to create a propagation delay model for the building. It would be desirable to use this propagation delay model to improve GPS aiding data for GPS receivers located within the building. It would further be desirable to generate multipath error data and positioning prediction data within a building. It would further be desirable to utilize this prediction data to improve GPS aiding data for GPS receivers located within the building.

SUMMARY

To alleviate the problems inherent in the prior art, and to allow the use of accurate positioning and timing information in attenuated environments such as buildings, a system, method, apparatus, and means for constructing building tomography and timing data is provided. Pursuant to one embodiment of the present invention, multipath error prediction is provided by first receiving GPS signal data at a receiver located within a building; determining multipath error at the receiver; logging the multipath error data; predicting the multipath error at the receiver based on GPS satellite location information. This process is repeated to improve prediction accuracy. Pursuant to some embodiments, the receiver is provided with multiple antennas, one positioned in a clear sky position to receive accurate, unattenuated GPS data, the other positioned within the building. Pursuant to some embodiments, only a single antenna is provided (in the building), while accurate GPS data is received from an external GPS data source.

Pursuant to some embodiments, multipath error data is logged and associated with a known satellite position over time. In some embodiments, the receiver is provided with an accurate timing system. In some embodiments, the accurate timing system is a second antenna positioned in a clear sky position to receive accurate GPS data.

Pursuant to another embodiment, a building delay model is generated by first capturing GPS signal data at multiple locations within the building. Multipath signal error data is determined for each of the multiple locations. The building delay model is constructed based on the multipath signal error data at each of the locations. This process is repeated to improve the building delay model. The building delay model is then used to assist GPS receivers operating within the building. In some embodiments, the GPS signal data is captured by differential GPS servers positioned at multiple locations within the building.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF THE INVENTION

Applicants have recognized that there is a need for a system, method, apparatus and means for utilizing GPS techniques inside buildings to create a propagation delay model for the building, and then using the delay model to improve GPS aiding data for GPS receivers located within the building. Applicants have further recognized that there is need to generate multipath error data and positioning prediction data within a building, and then utilize this data to improve GPS aiding data for GPS receivers located within the building. One benefit of embodiments of the present invention is that GPS receivers used in low-signal environments will enjoy greater accuracy and precision.

As used herein, the term "delay model" is used to refer to modeling of a variety of types of delay, including, for example, signal propagation delay, reflections, constructive and destructive interference such as slow and fast fading, and other signal distortions.

Figure 1:
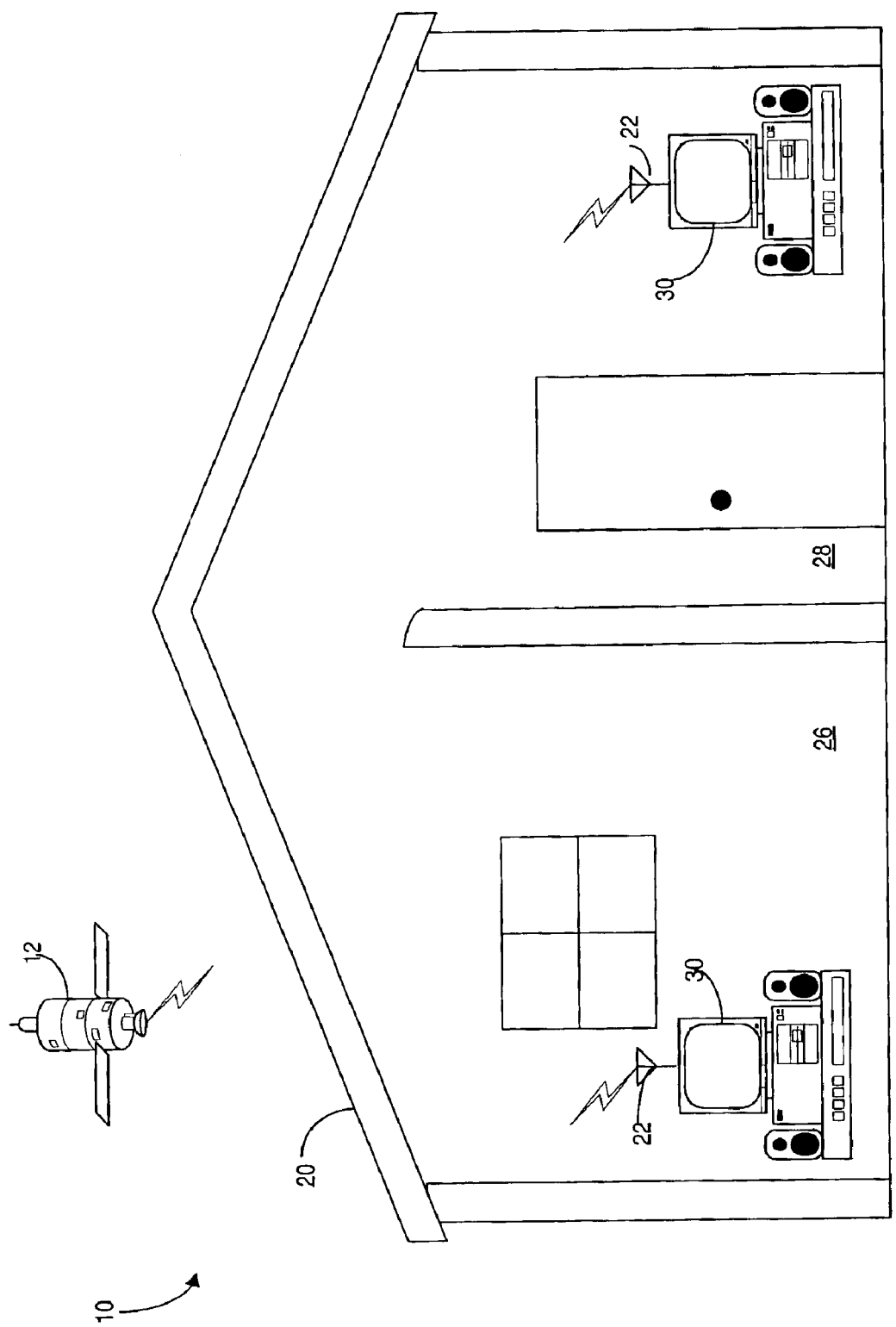
FIG. 1 is a block diagram of a system consistent with the present invention.

Referring now to FIG. 1, a system 10 according to embodiments of the present invention includes a number of receivers 30 each having antennas 22 adapted to receive signals from GPS satellites 12. Pursuant to embodiments of the present invention, receivers 30 may be positioned in a low-signal environment, such as the interior of a building 20. The interior of a building 20 is a challenging environment in which to receive accurate GPS timing and positioning data. Each room 26, 28 or other location within a building presents potentially different signal environments with different multipath and propagation errors. Aiding data for a device in one room may be different than aiding data for a device in a different room in the same building. Multipath and propagation errors may vary based on structural differences and location within a building.

Pursuant to embodiments of the present invention, aiding data is generated and distributed to receivers 30 by, for example, a central network device such as a network server (not shown). This aiding data may be generated based on a building model constructed which identifies multipath and propagation errors. Pursuant to some embodiments of the present invention, this building model is used to adjust aiding data, such as pseudoranges, for locations within the building. Pursuant to some embodiments of the present invention, aiding data may be generated based on predicted multipath error data for locations within the building. Each of these embodiments will be discussed further below.

Figure 2:
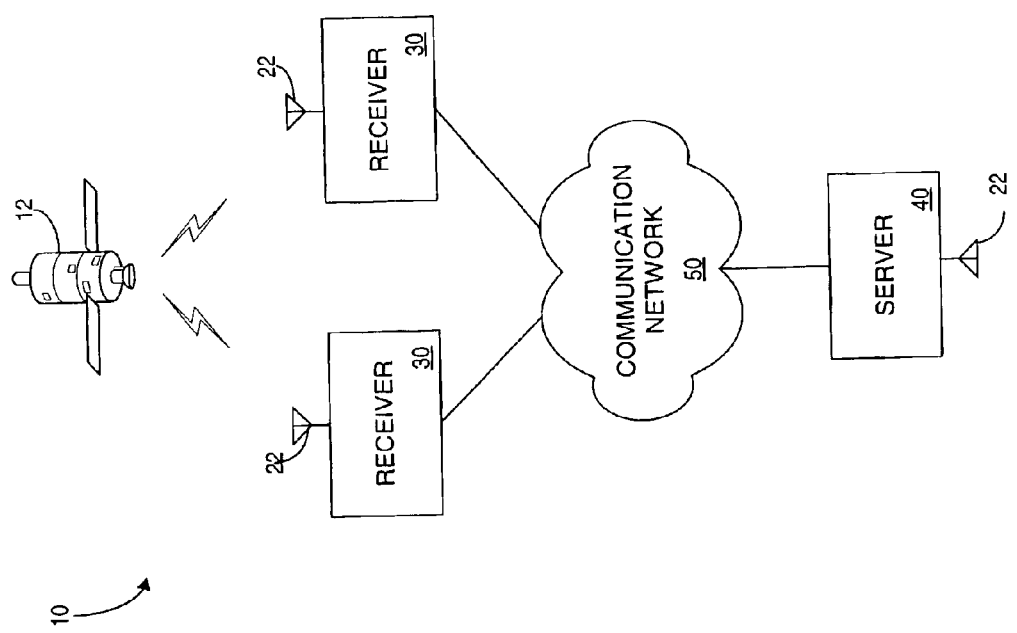
FIG. 2 is a block diagram of one embodiment of the system depicted in FIG. 1.

Referring now to FIG. 2, a block diagram of a system 10 is depicted. System 10 includes a number of receivers 30 having antennas 22 adapted to receive signal data from signal sources 12. Receivers 30 are in communication with one or more servers 40 via a communication network 50.

As used herein, antennas 22 any of a number of different types and combinations of antennas including, for example, fixed antenna, adaptive antenna or any composite antenna that may be composed of multiple individual antenna, such as phased array antenna.

As used herein, communication network 50 may employ any of a number of different types and modes of communication, and may be for example, a Local Area Network (LAN), a Metropolitan Area Network (MAN), a Wide Area Network (% VAN), a proprietary network, a Public Switched Telephone Network (PSTN), a Wireless Application Protocol (WAP) network, a wireless network, a cable television network, or an Internet Protocol (IP) network such as the Internet, an intranet or an extranet. Moreover, as used herein, communications include those enabled by wired or wireless technology. In one example embodiment, communication network 30 is a LAN implemented using Ethernet or other network technologies.

Communication network 30 allows communication among a number of devices, including receivers 30 and one or more servers 40. In one example embodiment, receivers 30 are computers and network 50 is an office network. Server 40 may be a network server performing network functions such as storing network files, etc. Server 40 may also be a differential GPS server. Pursuant to embodiments of the present invention, one or more of the receivers 30 include an antenna 22 for receiving data signals from one or more signal sources 12. In one currently-preferred embodiment, signal sources 12 are the constellation of global positioning system (GPS) satellites, and the data signals include GPS navigation data, timing data, and other data known to those skilled in the art. Those skilled in the art will recognize that embodiments of the present invention may be used with other signal sources as well. Some receivers 30 may be configured as assisted GPS (AGPS) devices while others may be configured as unassisted receivers.

Pursuant to embodiments of the present invention, some or all of the receivers 30 and their respective antennas 22 may be positioned indoors or in other environments with low GPS signal strength. Embodiments of the present invention allow system 10 to generate GPS aiding data for devices in the network despite the positioning of some or all of the network devices indoors or in an environment with low GPS signal strength. In one embodiment, this GPS aiding data is generated based on multipath error prediction data generated by operating server 40 to receive GPS signal data, including accurate GPS signal data (e.g., via a second antenna positioned in a clear sky position); determine multipath error data associated with data received via an antenna positioned inside the building; log the multipath error data and associate it with satellite position and timing information; and repeat the data collection and logging to improve a multipath prediction capability of the server. Once sufficient data has been logged and analyzed, server 40 provides aiding data to receivers 30 within the building based on the predicted multipath error developed for the building at various satellite positions.

In a second embodiment, server 40 is operated to receive GPS signal data that has been captured by various receivers 30 positioned within the building, determine multipath signal error data for each location, and construct a building delay model based on the error data. This process is repeated until sufficient data exists to provide a building delay model which can then be used to provide aiding data to receivers 30 operating within the building. The result is a system which allows GPS receivers to be accurately operated in low signal environments.

Any of a number of different types of receivers 30 may be used in embodiments of the present invention. For example, in some embodiments, some or all of the receivers 30 may be computers, such as those based on the Intel® Pentium® processor, that are adapted to communicate via communications network 50. The computer may be configured in any of a number of different manners, such as, for example, as a desk-top computer, lap-top computer, handheld computer, personal digital assistant (PDA), or the like. Some or all of the receivers 30 may include an antenna 22 to receive GPS signal data. Some of the receivers 30 may be operated as AGPS devices without an antenna. Some or all of the receivers 30 may be configured as other devices, such as, for example, wired or wireless telephones or the like.

One or more servers 40 may be used in embodiments of the present invention. Server 40 may be configured in any of a number of ways known to those skilled in the art, such as, for example, an Intel® Pentium® based-computer or the like. In some embodiments, system 10 includes server 40 which is operated to collect signal data received from one or more receivers 30 and to generate a building model based on the data and to provide aiding data to receivers 30 based on the building model. In some embodiments, server 40 is operated to collect multipath error data and to generate multipath predictions which can be used to provide aiding data to receivers 30. Any number of receivers 30 and servers 40 may be used in systems pursuant to embodiments of the present invention.

Figure 3:
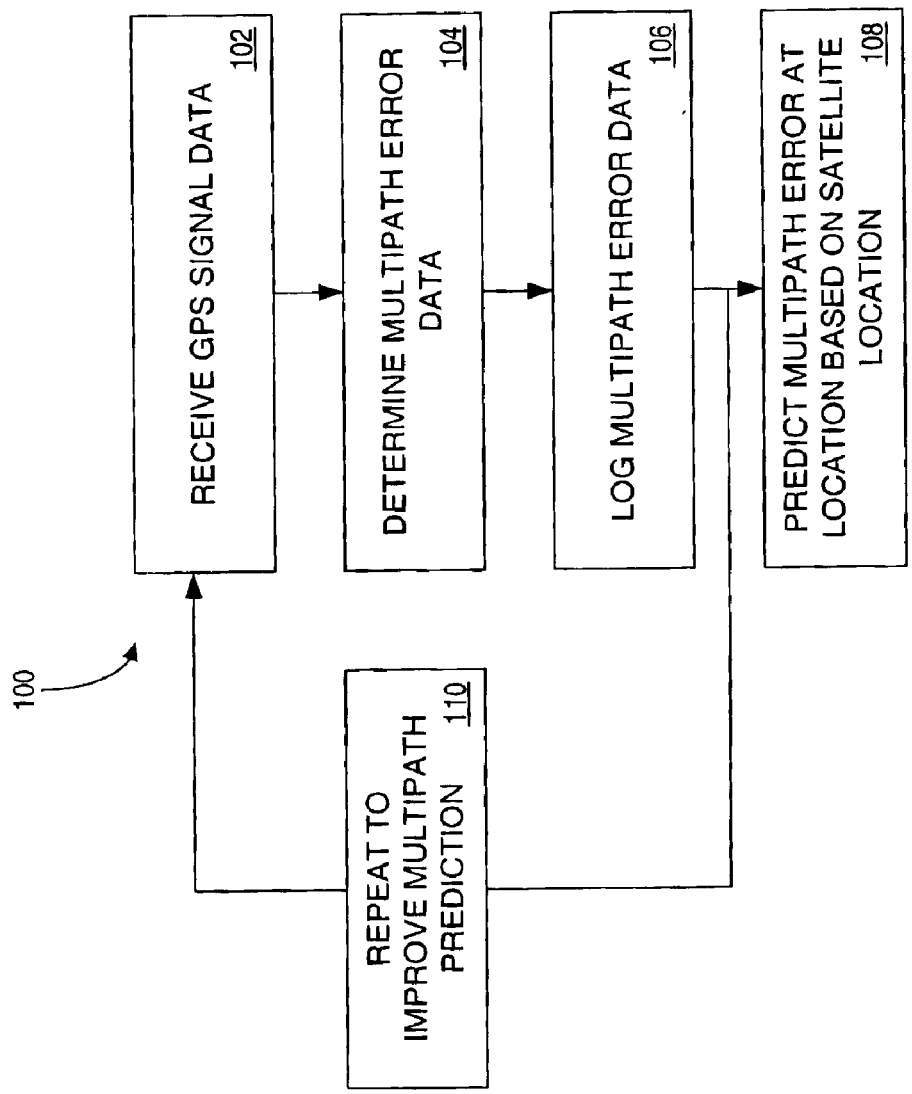
FIG. 3 is a flow diagram illustrating an exemplary process for operating a network to generate multipath error data for the system of FIG. 1.

A description of a process 100 for predicting multipath error within a building will now be provided by referring to FIG. 3. The particular arrangement of elements in the flow chart of FIG. 3 is not meant to imply a fixed order to the steps; embodiments of the present invention can be practiced in any order that is practicable. Process 100 begins at 102 where server 40 located within a building is operated to receive GPS signal data. This signal data may be received via one or more antennas. In one embodiment, one antenna is positioned in a clear sky position, allowing accurate, unattenuated capture of GPS signal data. At the same time, a second antenna, positioned inside the building, is operated to capture attenuated signal data. Processing continues at 104 where multipath error data associated with the captured signal data is determined. This multipath error data represents the delay associated with receipt of the GPS signal data by the second antenna (the antenna positioned within the building).

The multipath error data is logged at 106. In some embodiments, the multipath error data is logged and associated with information identifying the location of the satellite from which the data was received. This process continues via 110 to develop sufficient data to predict multipath error based on satellite location, or on the collective location of all satellites. Using this information, aiding data may be provided to individual receivers 30 located within the building to improve GPS accuracy and precision. Processing at 108 includes the prediction of multipath error within the building based on satellite location. This prediction is used to generate and forward aiding data to receivers 30 located within the building. Each of these devices may use the aiding data in manners known in the art to achieve precise positioning and timing.

Figure 4:
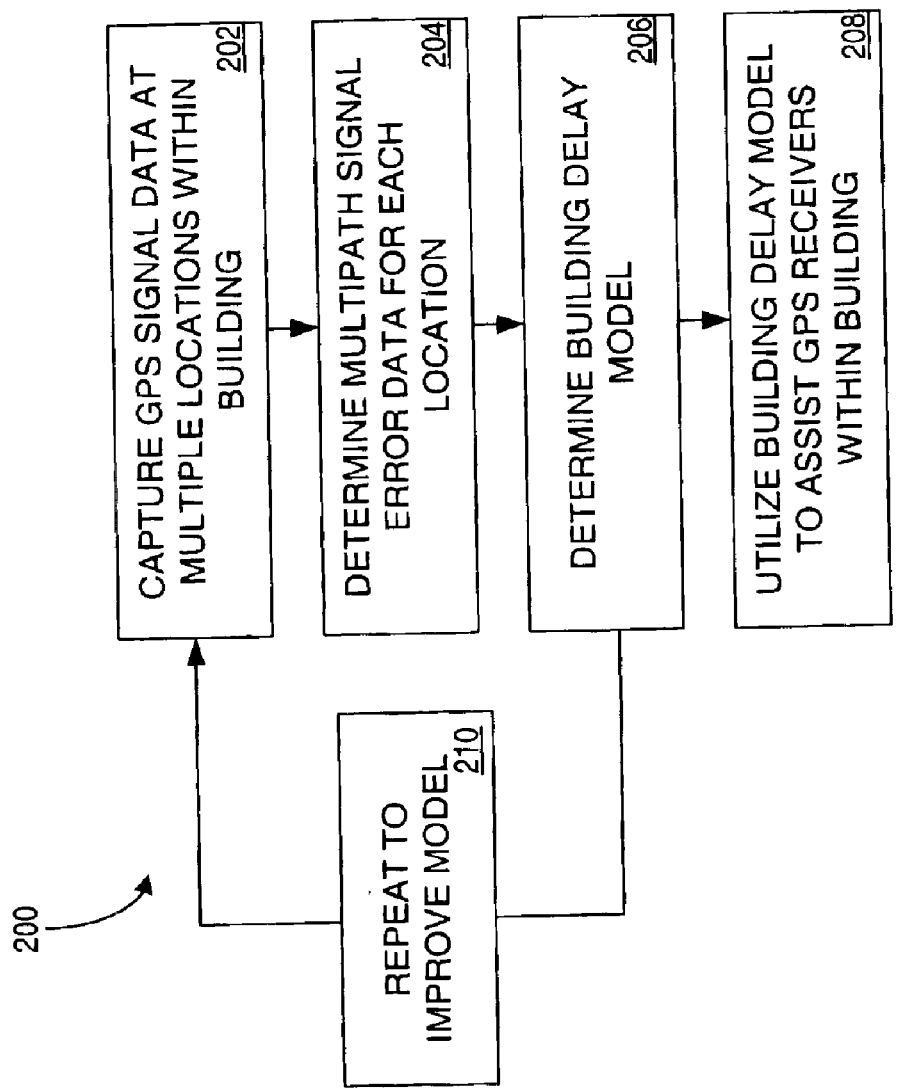
FIG. 4 is a flow diagram illustrating an exemplary process for operating a network to develop and utilize a building delay model for the system of FIG. 1.

Referring now to FIG. 4, a further embodiment is depicted. FIG. 4 depicts a process 200 for constructing a building delay model and using the building delay model to provide aiding data to receivers 30 within the building.

Process 200 begins at 202 where GPS signal data is captured at multiple locations within the building. For example, a variety of receivers 30 positioned throughout the building may be operated to captured GPS signal data. Processing continues at 204 where multipath signal error data is determined for each location within the building. For example, this processing may be performed by a differential GPS server 40 which receives the information from each receiver 30 and which calculates signal error data for each receiver 30. Based on this information, server 40 constructs a building delay model at 206. The building delay model may be based on multiple iterations 210. As an example, the differential server 40 may measure the delay error for each receiver 30 for data received from each satellite over a period of time.

Receivers 30 may be positioned throughout a building to establish good three dimensional penetration of the interior space of the building. For example, receivers 30 may be positioned on different floors, different corners, etc. The receivers 30 used to establish the map may be installed temporarily or they may be permanently located. The delay measurements taken may be used to generate the building model. The building model may be in the form of a discrete voxel model, or a parameterized model using techniques such as wavelets, discrete building components (e.g., floors and walls), etc. The model may be expressed directly as propagation delay as a function of receiver and satellite location. Once the model has been create, it is used at 208 to increase accuracy within the building. If an approximate location is known and inside (or near) the building, net propagation delay may be calculated by integrating through the delay model to make corrections to pseudoranges or other aiding data provided to receivers. The delay may be calculated by searching over possible locations in three dimensions within the building. Average delay estimates may also be used by integrating through three dimensional space as a cylinder rather than treating it as a ray.

In some embodiments, generic building models may be generated and used to provide aiding data in other buildings. For example, a generic two story office building model may be created and subsequently used in other similarly-constructed buildings. In some embodiments, a telecommunications carrier may utilize embodiments of the present invention to provide aiding data to telephone customers who desire high accuracy in their building. In some embodiments, urban or area models may also be generated. For example, an urban or area model may be generated which includes information about specific buildings and topography in a given area. Specific information about individual buildings in the area may be used to generate the model, including information about construction methodology, materials, window coatings, etc.

Although the present invention has been described with respect to a preferred embodiment thereof, those skilled in the art will note that various substitutions may be made to those embodiments described herein without departing from the spirit and scope of the present invention. For example, in some embodiments, different receivers 30 may utilize different types or designs of antennas to favor certain signals (such as those from certain directions or polarizations), reject certain signals, or in other ways aid in the collection of GPS data for the purpose of building the delay model described above.

What is claimed is:

1. A method for predicting multipath error data in a building, comprising:

receiving GPS signal data;

determining multipath error data;

logging said multipath error data with source position information; and predicting multipath error at said building based on source position information.

2. A method as in claim 1, wherein the multipath error data is determined from a building model created using signals received at a plurality of antennae and wherein one of the plurality of antennae is positioned outside the building at a location where an unobstructed line-of-sight to a source of the GPS signal data is achieved.

3. A method as in claim 1, wherein the multipath error data is determined by a differential GPS server.

4. A method as in claim 1, wherein the source information comprises a location of a GPS satellite.

5. A method as in claim 1, further comprising forwarding the logged multipath error data and the source position information to a server.

6. A method as in claim 5, wherein the server forwards to a mobile unit in the building aiding data for GPS acquisition based on the logged multipath error data and the source position information stored at the server.

7. A method as in claim 5, wherein the server receives logged multipath error data and source position information from a plurality of receivers positioned at a plurality of locations within the building.

8. A method as in claim 7, wherein the wherein the multipath error data is determined from a building model created using the logged multipath error data and source position information accumulated over a period of time.

9. A method as in claim 8, wherein the building model comprises a 3-dimensional spatial model.

10. A method as in claim 1, wherein the multipath error data comprises delay measurements.

11. A method as in claim 8, wherein the multipath error data comprises propagation delays expressed as functions of positions and times of GPS satellite from which the GPS signal data are obtained.

12. A method as in claim 8, wherein the building model is derived from a building model in a second building of similar construction.

13. A method as in claim 6, wherein the aiding data is provided by wireless communication.

14. A method as in claim 8, wherein the building model is one of a plurality of building models included in an area model.

15. A method as in claim 2, wherein the plurality of antennae are selected from a group consisting of directional antennae, antennae selective in signal polarizations, and antennae capable of selectively rejecting predetermined signal frequencies.

* * * * *